Figure 1:
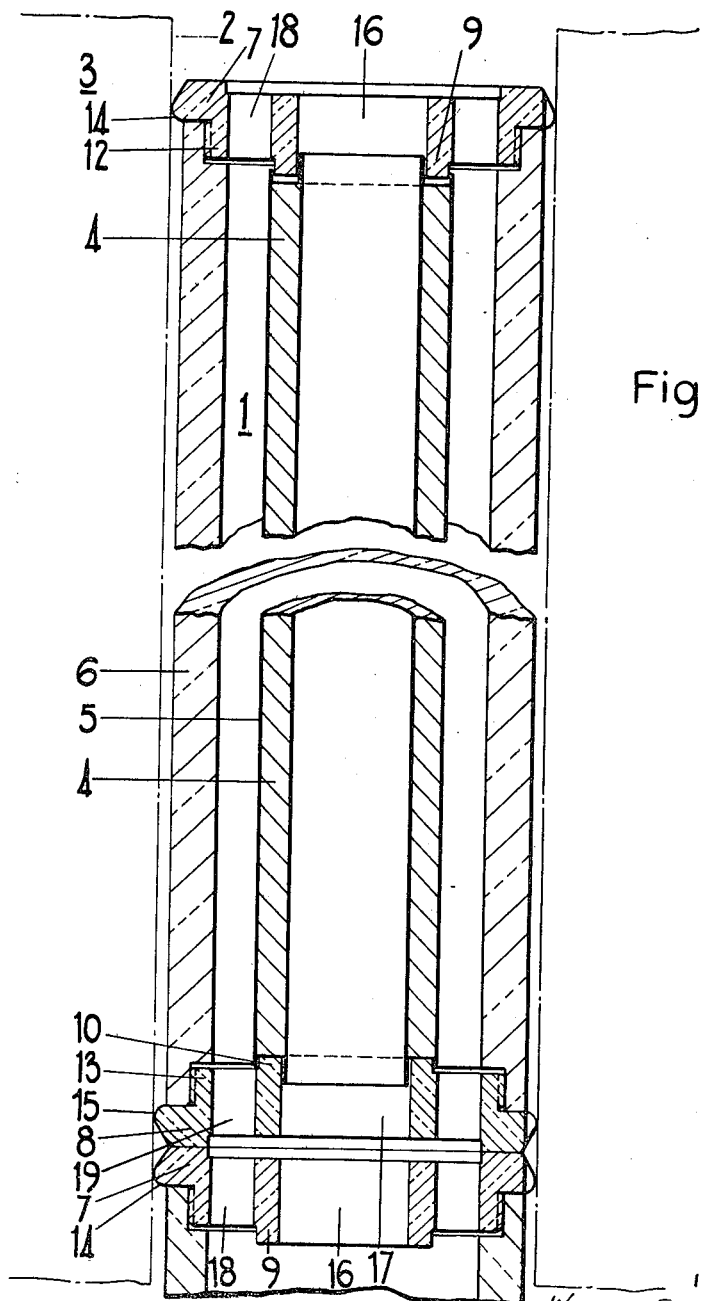

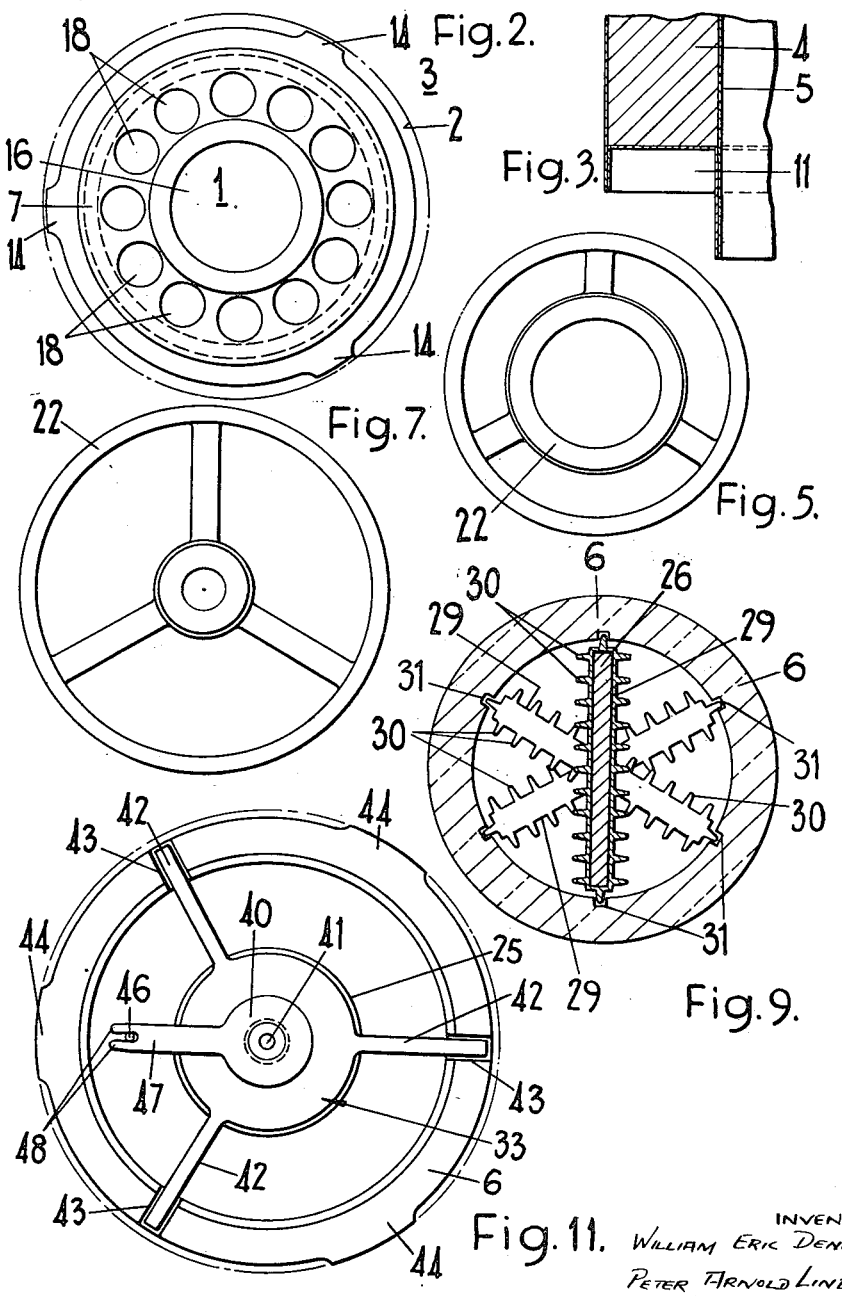

United States Patent Office 2,985,575
Patented May 23, 1961

2,985,575
NUCLEAR REACTORS

William Eric Dennis, Barnehurst, and Peter Arnold Lindley, Belvedere, England, assignors to The General Electric Company Limited, London, England Filed July 26, 1956, Ser. No. 600,188

Claims priority, application Great Britain July 27, 1955

11 Claims. (Cl. 204—193.2)

This invention relates to nuclear reactors of the kind having a core including or formed of moderating material and with passages for the fuel elements of the reactor, and cooling medium such as gas being arranged to flow through the passages to abstract heat from the fuel elements.

In connection with gas cooled reactors of this kind, difficulty has been experienced in designing and constructing moderator systems which obviate mechanical abrasion of the passages in a reactor core during fuel charging and discharging operations, avoid chemical attack on the moderator by the gas with or without mass transfer of moderating material within the system, and overcome the effects of radio-active contamination which would render a passage unsuitable for further use.

An object of the present invention is the provision of a nuclear reactor which substantially meets these requirements in a convenient manner.

Accordingly to the present invention, a fuel element arrangement in or for a nuclear reactor of the kind specified comprises one or more fuel elements housed within a tubular member constituting or being arranged to constitute a lining or part lining for a passage in the reactor core, the fuel element or elements and the tubular member forming together a replaceable unit.

The fuel element or elements would be carried and supported by the said tubular member and would be so arranged therein that cooling medium such as gas, may flow through the member to abstract heat from the fuel element or elements.

Thus, a tubular member may be of circular cross-section perpendicular to its length and a fuel element or elements be set along the axis of the member spaced away from the inside wall thereof by one or more spacing members.

Preferably, the tubular member is of moderating material or materials but it is not necessarily so; other suitable materials may be used.

A plurality of tubular members in line set in a passage in the reactor core would constitute, as it were, a replaceable channel in the core and the unit construction of the elements of the replaceable channel enables easy replacement of a damaged or contaminated tubular member. Further, upon a fuel element or elements becoming depleted or developing a fault, its or their replacement by removal of the complete unit is a simple matter and the process of charging or discharging is carried out without the abrasion which occurs in existing known reactors.

If desired, the material of the tubular member and the or each spacing member may be coated or treated with material which prevents or limits any chemical or physical attack thereon.

The or each spacing member may be of metal, graphite, ceramic or cermet material and may positively locate a fuel element, encased in a can, from the inside wall of a tubular member.

In order that the invention may be clearly understood, five fuel element arrangements in accordance with the invention will now be described by way of example with reference to the eleven figures of the accompanying drawings in which Figure 1 shows a central vertical section of part of the first arrangement, Figure 2 a plan view of this arrangement and Figure 3 an enlarged sectional detail of the arrangement. Figures 4 and 5, 6 and 7, 8 and 9, and 10 and 11 show respectively central vertical sections and plan views of four other fuel element arrangements. For simplicity, in each of the arrangements only one replaceable unit formed by a fuel element and a tubular member is shown in its entirety, and like parts in the five arrangements have been given the same reference numerals.

Referring now to Figures 1, 2 and 3, the replaceable unit 1 shown is one of a plurality set in line in a passage 2 in a core 3 of a reactor, the passage 2 being vertically arranged although as will be appreciated a similar arrangement can be used for horizontally arranged passages in a reactor core. Each replaceable unit 1 comprises a hollow tubular fuel element 4 of uranium encased by a stainless steel sheath or can 5, the sheath 5 being formed from inner and outer tubes and end caps suitably welded together as by argon arc welding. The fuel element 4 is of circular cross-section and is coaxial with a cylinder 6 of graphite constituting a tubular liner for the wall of the main passage 2 in the reactor core 3, and providing a channel for the flow of cooling gas.

The fuel element 4 is supported within the cylinder 6 by upper and lower end spacing members or caps 7 and 8 respectively, each spacing member having a part 9 or 10 engaging in the space 11 (see Figure 3) between the projecting ends of the inner and outer steel tubes of the sheath 5 and a part 12 or 13 engaging in a stepped portion at the upper or lower end respectively of the graphite cylinder 6. Further, each member 7 or 8 is provided with three external and radially projecting lugs 14 or 15 which engage the wall of the passage 2 and with through apertures for the passage of cooling gas. These apertures consist of a large central aperture 16 or 17 of approximately the same size as the internal cross-section of the fuel element 4 and a plurality of outer apertures 18 or 19 communicating with the space between the fuel element 4 and graphite cylinder 6.

Figure 4:
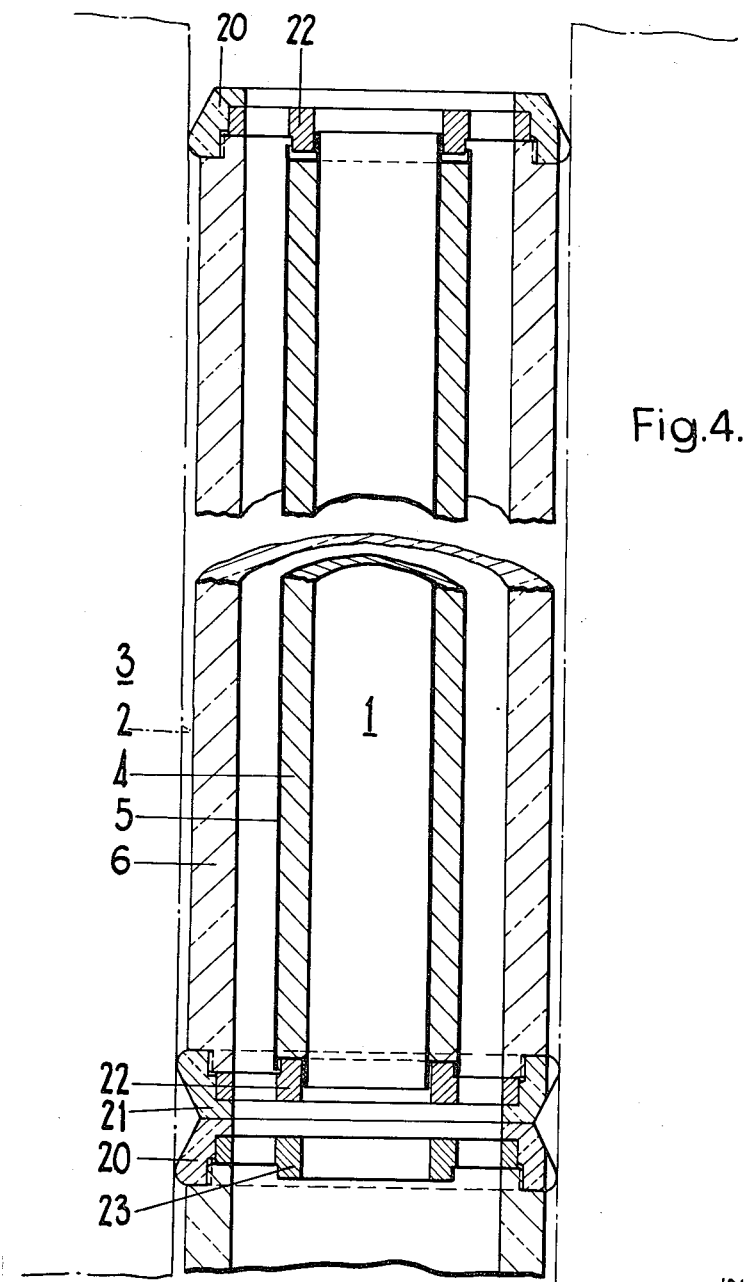

The fuel element arrangement shown in Figures 4 and 5 is generally similar to that shown in Figures 1, 2 and 3, and referring to Figures 4 and 5, it will be seen that instead of using a graphite spacing member or cap at each end of the fuel element 1 and cylinder 6, a composite spacing member consisting of a graphite ring 20 or 21 and a metal spider 22 or 23, shown in plan view in Figure 5, is used. The spiders fit in their graphite rings and may be of beryllium or other suitable metal or material combining adequate strength with a low captive cross-section for thermal neutrons. Each spider 22 or 23 is suitably apertured for the flow of cooling gas as in the case of the graphite spacing members in the first arrangement.

Figure 6:
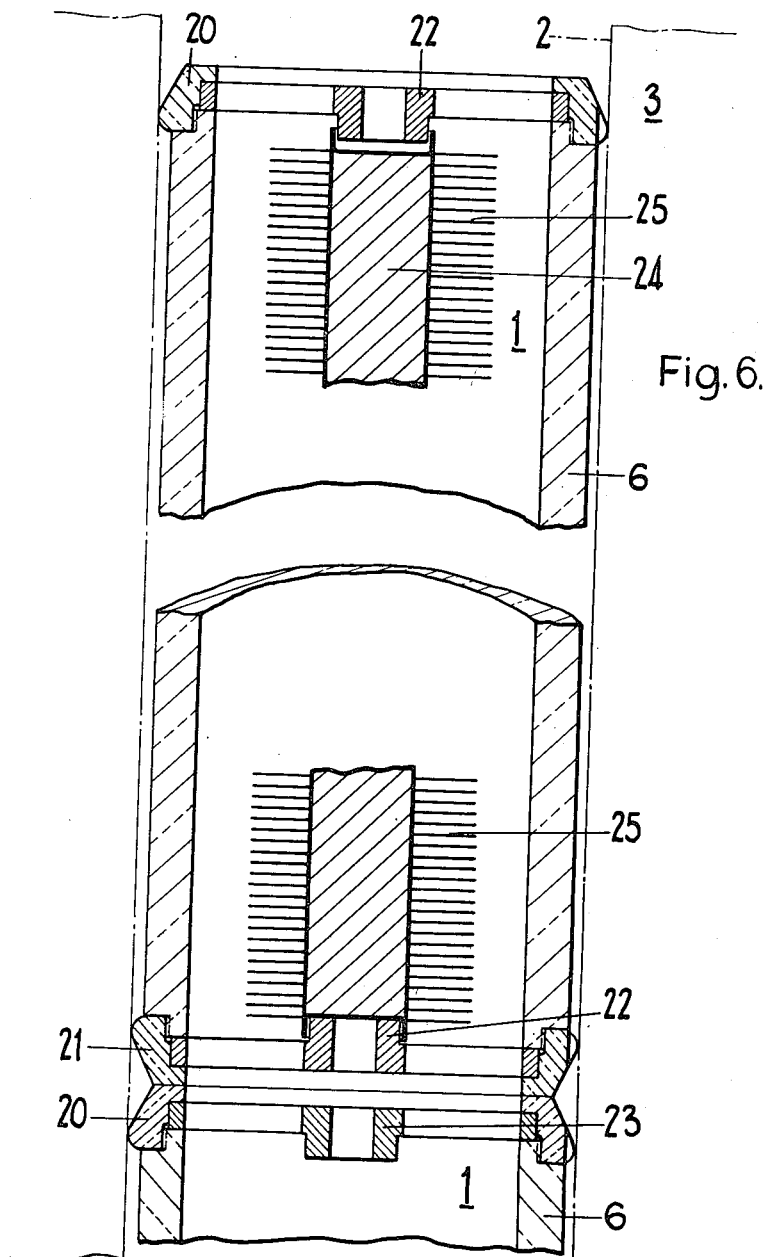

Figures 6 and 7 show the third fuel element arrangement and referring to these figures, each graphite cylinder 6 supports a conventional type of fuel element 24 in which the sheath or can is made with a series of closely space circumferential fins 25. The overall diameter of the replaceable unit 1 is greater in this arrangement than in the previously described arrangements due to the need to provide adequate cross-sectional area for gas flow but, as in the second arrangement, a fuel element 24 is supported by a composite spacing member consisting of a graphite ring 20 or 21 fitting in the channel 2, and a metal spider 22 or 23 (shown in plan view in Figure 7) engaging both the fuel element 24 and the associated ring 20 or 21.

Figure 8:
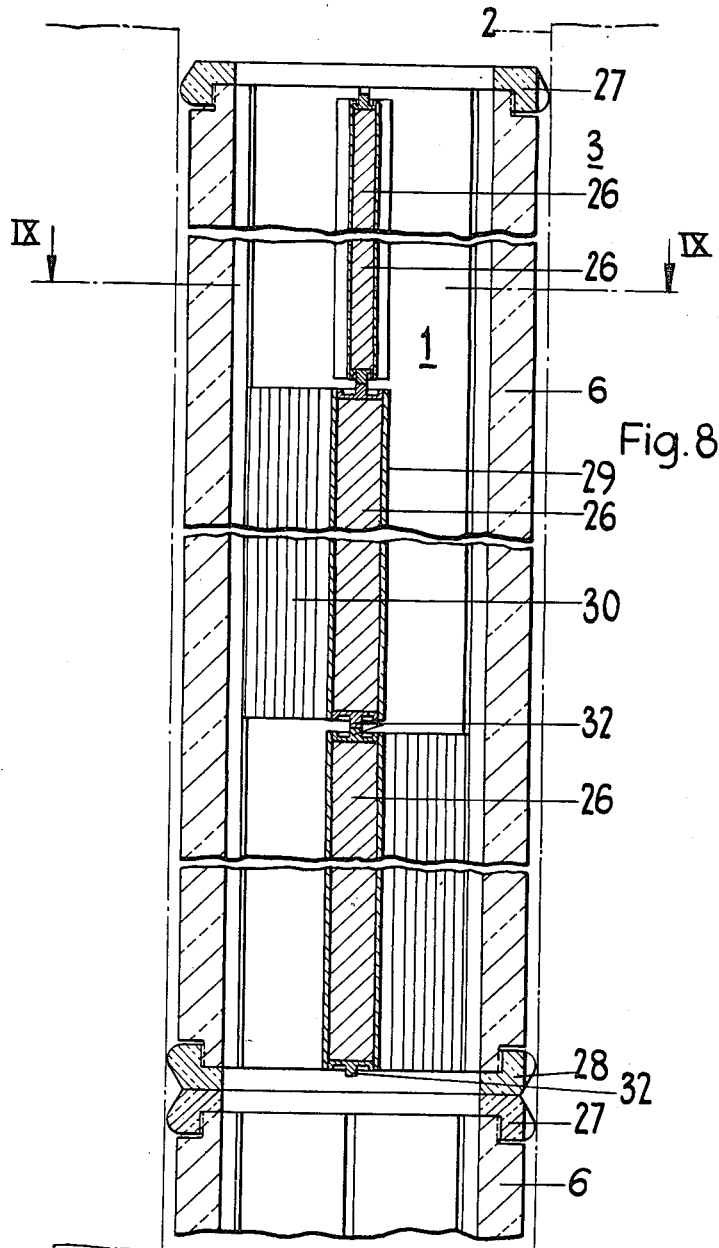

The fourth fuel element arrangement, shown in Figures 8 and 9 to which reference is now made differs from the other arrangements in that a single graphite cylinder 6 supports a plurality of fuel elements 26. Each fuel element 26 is a flat element of relatively short length and three (or more or less) elements are enclosed in the cylinder 6 between graphite end spacing members or caps 27 or 28. As will be seen from Figure 9, which is a section on the line IX—IX in Figure 8, the elements 26 are disposed at equal angles one to another so as to provide a good transverse mixing of the cooling gas as it passes along the inside of the cylinder 6 and the sheaths 29 of the elements provided with fins 30 engage at their ends in slots 31 in the inside wall of the cylinder 6. Each fuel element 26 is also provided at each end with a spacing button 32 and the purpose of these buttons 32 is to space the elements apart slightly and thereby to avoid hot spots which might occur if they rested directly one on the other. The end fins of the outermost fuel elements 26 rest against the end spacing members or caps 27 and 28.

The spacing members need not necessarily include end caps or rings engaging in stepped portions in the upper and lower ends of the graphite cylinder 6, and the radially projecting lugs may be integral with the cylinder rather than the spacing members. Thus, in the fifth fuel element arrangement shown in Figures 10 and 11, a conventional type of fuel element 24 encased in a sheath or can with circumferential fins 25 is, as in Figure 6, supported within each graphite cylinder 6. In this arrangement, however, the spacing members are not composite, no end rings being provided; though still of spider type, the members are no longer made of metal but of amorphous carbon. The upper carbon spider 33 and the lower spider 34 are quite different in design since, while the upper spider 33 merely serves to keep the top end of the element 24 central in the graphite cylinder 6, the lower spider 34 must also support the full weight of the element. The latter consists of three detachable arms 35 entering at one extremity into slots 36 milled at equal intervals round the periphery of the cylinder 6 and at the other extremity locking into a boss 37. A spigot 38 formed at the end of the sheath or can in which the element 24 is encased passes through an orifice in the boss 37, and a disc 39 secured to the spigot 38 serves the dual purpose of attaching the boss 37 to the element 24 and further locking the arms 35 in the boss 37 by closure of the lower end of the boss. A somewhat similar disc or plate 40 retains the upper spider 33 in position; this upper spider is a one piece pressing with an orifice similar to that provided in the boss 37 to take a spigot 41 attached to the sheath or can of the element 24. The three arms 42 of the spider 33 are placed in open single-ended slots 43 milled into the top of the graphite cylinder 6, thus allowing the element 24 to expand freely in a vertical direction relative to the cylinder. Radially projecting lugs 44 to space the cylinder 6 centrally within the channel 2 are in this case integral with the cylinder 6 and are provided at the upper end of the cylinder only, the upper end of one cylinder 6 being made conical and locating in the centre of the channel 2 the socket-shaped lower end of the cylinder immediately above it.

Figure 10:
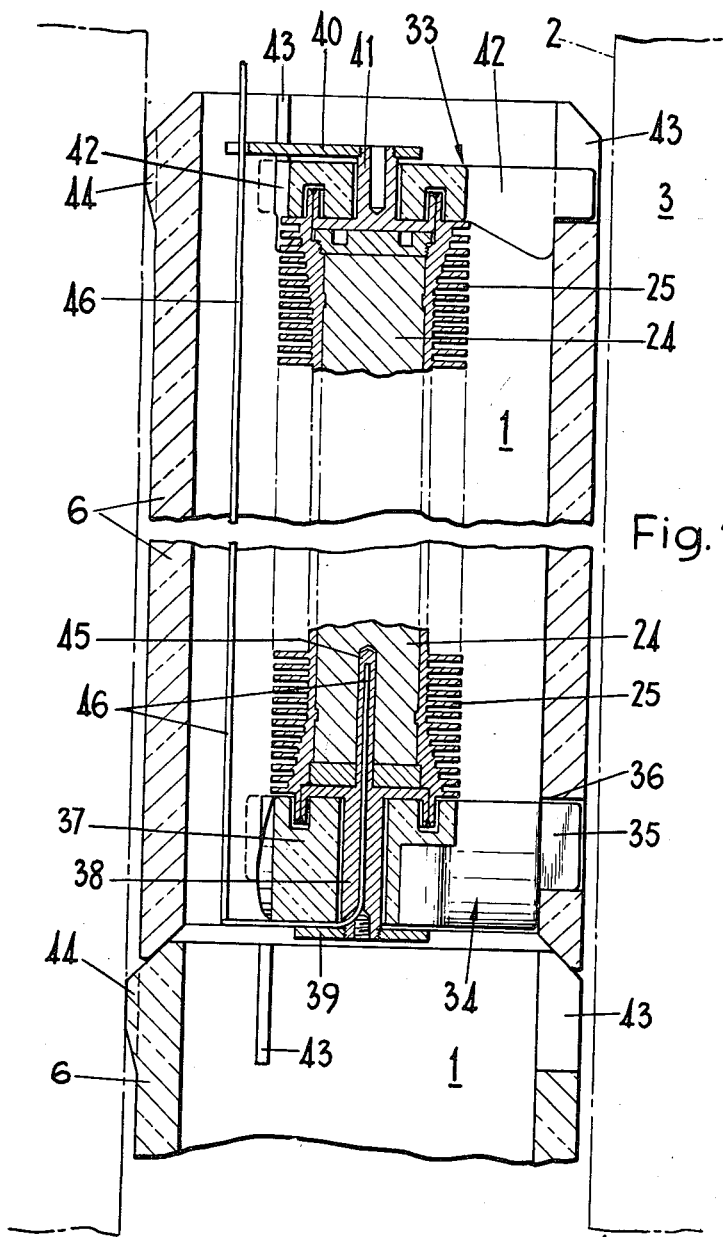

Figure 10 also shows the arrangement adopted when it is desired to measure the temperature in the interior of the uranium element. In this case a further spigot 45 passing up into the element 24 is provided at the lower end of the element sheath or can, and this spigot 45 is drilled to accommodate a thermocouple 46. The thermocouple 46 passes out sideways through an orifice in the spigot 38 and between the boss 37 and disc 39, then upwards along the interior of the cylinder 6 and is clamped in position by the disc or plate 40, which is provided with an arm 47 (Figure 11) with forked jaws 48 which can be crimped to grip the thermocouple 46 and hold it in place.

All the fuel element arrangements described above permit expansion of the fuel elements and since either the end spacing members or the graphite cylinder are provided with radially projecting spacing lugs which engage the inside of the channel 2 in the core 1, it is impossible or extremely unlikely that a replaceable unit can become jammed in a channel 2 due say to thermal expansion or distortion. Further, since the graphite cylinder of a unit supports the or a plurality of fuel elements, the fuel elements themselves are unstressed and carry no weight of, say, fuel elements above them.

We claim:
1. In a nuclear reactor of the kind having a core including moderating material and provided with passages for the fuel elements of the reactor, cooling medium being arranged to flow through the passages to abstract heat from the fuel elements, that improvement constituting an improved fuel element arrangement comprising a plurality of tubular members mounted in line in at least one of said passages and spaced from the inside wall thereof, each tubular member forming a lining for part of the length of said passage and cooperating with the other tubular members therein to form a flow channel for cooling medium, and a plurality of fuel elements, each fuel element being housed within and supported by one of said tubular members and forming therewith a replaceable unit.

2. In a nuclear reactor of the kind having a core including moderating material and provided with passages for the fuel elements of the reactor, cooling medium being arranged to flow through the passages to abstract heat from the fuel elements, that improvement constituting an improved fuel element arrangement comprising a plurality of tubular members mounted in line in at least one of said passages and spaced from the inside wall thereof, each tubular member forming a lining for part of the length of said passage and cooperating with the other tubular members therein to form a flow channel for cooling medium, spacing members associated with said tubular members, and a plurality of fuel elements set along the axis of said tubular members and spaced from the inner walls thereof by said spacing members, each fuel element being housed within and supported by one of said tubular members and forming therewith a replaceable unit.

3. An improved fuel element arrangement according to claim 2 wherein the surfaces of said tubular members and said spacing members have been treated to prevent any chemical or physical attack thereon.

4. An improved fuel element arrangement according to claim 2 wherein each tubular member is of circular cross-section perpendicular to its length.

5. In a nuclear reactor of the kind having a core including moderating material and provided with passages for the fuel elements of the reactor, cooling medium being arranged to flow through the passages to abstract heat from the fuel elements, that improvement constituting an improved fuel element arrangement comprising a plurality of tubular members of moderating material mounted in line in at least one of said passages and spaced from the inside wall thereof, each tubular member forming a lining for part of the length of said passage and cooperating with the other tubular members therein to form a flow channel for cooling medium, and a plurality of fuel elements, each fuel element being housed within and supported by one of said tubular members and forming therewith a replaceable unit.

6. In a nuclear reactor of the kind having a core including moderating material and provided with passages for the fuel elements of the reactor, cooling medium being arranged to flow through the passages to abstract heat from the fuel elements, that improvement constituting an improved fuel element arrangement comprising a plurality of tubular members mounted in line in at least one of said passages and spaced from the inside wall thereof, each tubular member forming a lining for part of the length of said passage and cooperating with the other tubular members therein to form a flow channel for cooling medium, graphite spacing members associated with said tubular members, and a plurality of fuel elements set along the axis of said tubular members and spaced from the inner walls thereof by said spacing members, each fuel element being encased in a can and positively located within one of said tubular members by said spacing members, and forming with said one tubular member a replaceable unit.

7. In a nuclear reactor of the kind having a core including moderating material and provided with passages for the fuel elements of the reactor, cooling medium being arranged to flow through the passages to abstract heat from the fuel elements, that improvement constituting an improved fuel element arrangement comprising a plurality of tubular members mounted in line in at least one of said passages, each tubular member forming a lining for part of the length of said passage and cooperating with the other tubular members therein to form a flow channel for cooling medium, radially projecting spacing lugs on the exterior of each of said tubular members, said lugs being adapted to engage the inside wall of said passage, spacing members associated with said tubular members, and a plurality of fuel elements set along the axis of said tubular members and spaced from the inner walls thereof by said spacing members, each fuel element being housed within and supported by one of said tubular members and forming therewith a replaceable unit.

8. An improved fuel element arrangement according to claim 7 wherein the said spacing lugs are provided at one end only of each of said tubular members, the other end of each said tubular member being adapted to engage with, and be located by, the lugs provided on an adjacent tubular member situated in the same passage.

9. An improved fuel element arrangement according to claim 7 wherein the said spacing lugs on a tubular member are integral therewith, and are provided at one end only of each of said tubular members, the other end of each said tubular member being adapted to engage with, and be located by, the lugs provided on an adjacent tubular member situated in the same passage.

10. In a nuclear reactor of the kind having a core including moderating material and provided with passages for the fuel elements of the reactor, cooling medium being arranged to flow through the passages to abstract heat from the fuel elements, that improvement constituting an improved fuel element arrangement comprising a plurality of tubular members mounted in line in at least one of said passages, a plurality of fuel elements supported by said tubular members, each tubular member forming a lining for part of the length of said passage and cooperating with the other tubular members therein to form a flow channel for cooling medium, and each fuel element being housed within one of said tubular members and forming therewith a replaceable unit.

11. An improved fuel element arrangement as set forth in claim 10 wherein at least one of the tubular members houses a plurality of fuel elements and forms therewith a replaceable unit.

References Cited in the file of this patent

UNITED STATES PATENTS

| | | |
|---|---|---|
| 2,708,656 | Fermi et al. | May 17, 1955 |
| 2,743,226 | Newson | Apr. 24, 1956 |
| 2,790,760 | Powell | Apr. 30, 1957 |
| 2,831,807 | McGarry | Apr. 22, 1958 |

FOREIGN PATENTS

| | | |
|---|---|---|
| 618,508 | Great Britain | Feb. 23, 1949 |

OTHER REFERENCES

Proceedings of the International Conference on the Peaceful Uses of Atomic Energy, August 1955, pub. by United Nations Publications, N.Y.; vol. 3, pp. 334–337; vol. 2, pp. 310–313, 341–350 and 444.